US009025967B2

(12) United States Patent
Ciaramella

(10) Patent No.: US 9,025,967 B2
(45) Date of Patent: May 5, 2015

(54) ALL-OPTICAL PHASE-MODULATED DATA SIGNAL REGENERATION

(75) Inventor: Ernesto Ciaramella, Pisa (IT)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 273 days.

(21) Appl. No.: 13/505,561

(22) PCT Filed: Dec. 10, 2009

(86) PCT No.: PCT/EP2009/066827
§ 371 (c)(1),
(2), (4) Date: Jun. 14, 2012

(87) PCT Pub. No.: WO2011/057679
PCT Pub. Date: May 19, 2011

(65) Prior Publication Data
US 2012/0263480 A1    Oct. 18, 2012

(30) Foreign Application Priority Data
Nov. 11, 2009 (EP) ..................................... 09175711

(51) Int. Cl.
*H04B 10/17* (2006.01)
*H04B 10/00* (2013.01)
*H04B 10/299* (2013.01)

(52) U.S. Cl.
CPC .................................. *H04B 10/299* (2013.01)

(58) Field of Classification Search
CPC . H04B 10/1149; H04B 10/299; H04B 10/272
USPC .................................. 398/176, 175, 173, 188
See application file for complete search history.

(56) References Cited

U.S. PATENT DOCUMENTS

| 6,201,621 B1 | 3/2001 | Desurvire et al. |
| 7,369,779 B1 | 5/2008 | Croussore et al. |

(Continued)

FOREIGN PATENT DOCUMENTS

| CN | 1874196 A | 12/2006 |
| CN | 1947363 A | 4/2007 |

(Continued)

OTHER PUBLICATIONS

Johannisson ["Suppression of Phase Error in Differential Phase-Shift Keying Data by Amplitude Regeneration" Optics Letters May 15, 2006/vol. 31, No. 10].*

(Continued)

*Primary Examiner* — Oommen Jacob
(74) *Attorney, Agent, or Firm* — Baker Botts, LLP

(57) ABSTRACT

All-optical phase-modulated data signal regenerator apparatus (10) comprising an optical input (12), an optical signal converter (16), an optical carrier signal source (18), optical signal forming apparatus (20) and an optical output (14). The input (12) is arranged to receive a phase-modulated optical data signal. The signal converter (16) is arranged to receive the data signal and to convert phase modulation of the data signal into a corresponding intensity modulation of an intermediate optical signal. The carrier signal source (18) provides an optical carrier signal. The signal forming apparatus (20) is arranged to receive the carrier signal and the intermediate optical signal, and comprises a first element arranged to receive the intermediate optical signal and to apply a transfer function for effecting reshaping and resizing, and a second element for effecting transfer of an intensity modulation of the intermediate optical signal into a phase modulation on the optical carrier signal to form a regenerated phase-modulated optical data signal. The output (14) is arranged to output the regenerated optical data signal.

15 Claims, 7 Drawing Sheets

(56) References Cited

U.S. PATENT DOCUMENTS

| | | | |
|---|---|---|---|
| 2007/0071449 A1* | 3/2007 | Kang | 398/161 |
| 2007/0071456 A1* | 3/2007 | Chen et al. | 398/204 |
| 2009/0129788 A1* | 5/2009 | Seimetz | 398/208 |
| 2012/0263480 A1* | 10/2012 | Ciaramella | 398/176 |

FOREIGN PATENT DOCUMENTS

| | | |
|---|---|---|
| CN | 101258699 A | 9/2008 |
| CN | 101340242 A | 1/2009 |
| WO | WO 99/55038 | 10/1999 |

OTHER PUBLICATIONS

Kang ["Regenerative All Optical Wavelength Conversion of 40-Gb/S DPSK Signals Using a Semiconductor Optical Amplifier Mach Zehnder Interferometer" ECOC 2005].*

Matsumoto ["A Fiber Based All Optical 3R Regenerator for DPSK Signals" IEEE photonics technology letters 2007].*

International Search Report for PCT/EP2009/066827 mailed Jul. 1, 2010.

P. Brindel et al., "Black Box Optical Regenerator for RZ Transmission Systems", Electronics Letters, IEE Stevenage, vol. 35, No. 6, Mar. 18, 1999, pp. 480-481.

A.H. Gnauck et al., "Optical Phase-Shift-Keyed Transmission", Journal of Lightwave Technology, vol. 23, No. 1, Jan. 2005, pp. 115-130.

V.S. Grigoryan et al., "Mechanism of SOA-Based Regenerative Amplification of Phase-Noise Degraded DPSK Signals", Electronics Letters, vol. 41. No. 18, Sep. 1, 2005, 2 pages.

P. Johannisson et al., "Suppression of Phase Error in Differential Phase-Shift Keying Data by Amplitude Regeneration", Optics Letters, vol. 31. No. 10, May 15, 2006, pp. 1385-1387.

M. Matsumoto, "Regeneration of RZ-DPSK Signals by Fiber-Based All-Optical Regenerators", IEEE Photonics Technology Letters, vol. 17, No. 5, May 2005, pp. 1055-1057.

K. Stubkjaer, "Semiconductor Optical Amplifier-Based All-Optical Gates for High-Speed Optical Processing", IEEE Journal on Selected Topics in Quantum Electronics, vol. 6, No. 6, Nov. 2000, pp. 1428-1435.

I. Kang, et al., "Regenerative All Optical Wavelength Conversion of 40-Gb/s DSPK Signals Using a Semiconductor Optical Amplifier Mach-Zehnder Interferometer", Bell Laboratories—Lucent Technologies, 2 pages, ECOC 2005.

First Office Action issued by the State Intellectual Property Office, P.R. China for Patent Application No. 200980163284.3, (Chinese Office Action and Translation), Aug. 4, 2014.

* cited by examiner

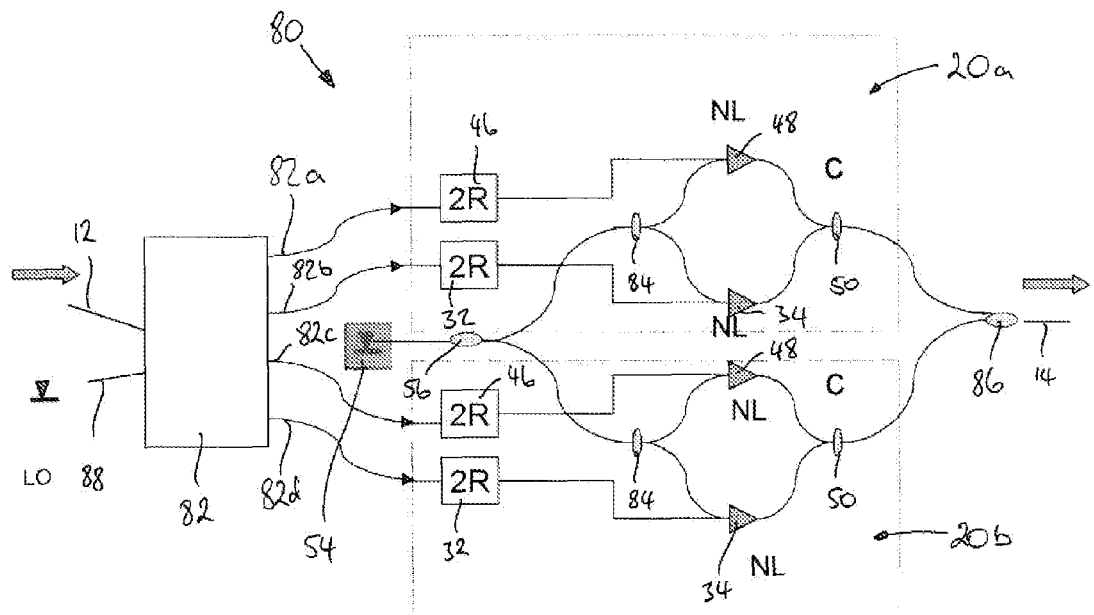
Fig. 5
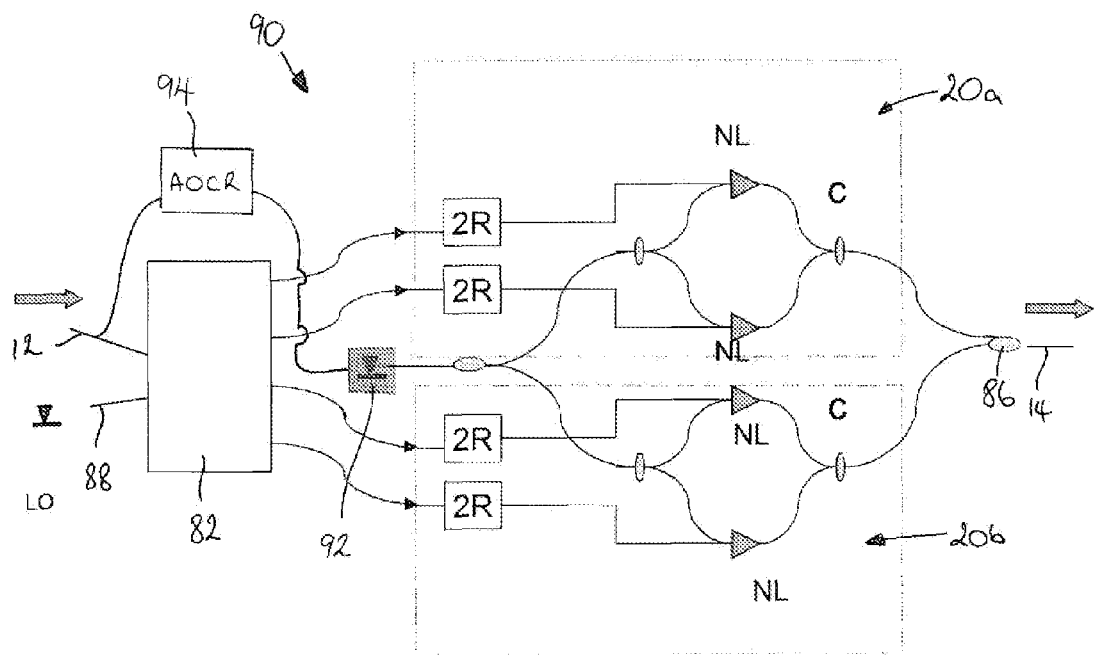

ALL-OPTICAL PHASE-MODULATED DATA SIGNAL REGENERATION

This application is the U.S. national phase of International Application No. PCT/EP2009/066827 filed 10 Dec. 2009 which designated the U.S. and claims priority to EP 09175711.2 filed 11 Nov. 2009, the entire contents of each of which are hereby incorporated by reference.

FIELD OF THE INVENTION

The invention relates to all-optical phase-modulated data signal regenerator apparatus and to a method of regenerating a phase-modulated optical data signal.

BACKGROUND OF THE INVENTION

Dense wavelength division multiplexed (DWDM) optical transport networks are evolving towards the use of phase modulated optical data signals, the most promising signal formats being differential phase shift keying (DPSK) and differential quadrature phase shift keying (DQPSK). The increase in the bit rate used in optical transport networks, of up to 40 Gbs and 100 Gbs, results in lower tolerance to amplified spontaneous emission (ASE) noise, chromatic dispersion and polarization mode dispersion (PMD). Effective solutions for regenerating phase modulated optical data signals are therefore required in order to preserve the signal quality. A number of proposals have been reported for regenerating DPSK signals, but most do not tackle the main issue related to phase modulated data signal formats, namely the sensitivity to both phase and amplitude noise, and no viable solution has been presented to date for regeneration of DPSK signals. The most promising proposal was reported by I Kang et al, ECOC 2005, post deadline paper Th 4.3.3, comprises regenerative all optical wavelength conversion of 40 Gbs DPSK signals using a semi-conductor optical amplifier Mach-Zehnder interferometer. However the scheme reported by Kang et al alters the encoding of the data during the wavelength conversion process.

SUMMARY OF THE INVENTION

It is an object to provide an improved all-optical phase-modulated data signal regenerator. It is a further object to provide an improved method of regenerating a phase-modulated optical data signal.

A first aspect of the invention provides all-optical phase-modulated data signal regenerator apparatus comprising an optical input, an optical signal converter, an optical carrier signal source, optical signal forming apparatus and an optical output. Said optical input is arranged to receive a phase-modulated optical data signal. Said optical signal converter is arranged to receive said phase-modulated optical data signal and to convert phase modulation of said phase-modulated optical data signal into a corresponding intensity modulation of an intermediate optical signal. Said optical carrier signal source is arranged to provide an optical carrier signal. Said optical signal forming apparatus is arranged to receive said optical carrier signal and said intermediate optical signal. Said optical signal forming apparatus comprises first and second elements. Said first element is arranged to receive said intermediate optical signal and to apply a transfer function for effecting reshaping and resizing. Said second element is for effecting transfer of an intensity modulation of said intermediate optical signal into a phase modulation on said optical carrier signal to thereby form a regenerated phase-modulated optical data signal. Said optical output is arranged to output said regenerated phase-modulated optical data signal.

Such an all-optical phase-modulated data signal regenerator apparatus can preserve the phase-modulation of the data signal during regeneration.

In an embodiment, said first element comprises a resizing reshaping regenerator arranged to receive said intermediate optical signal and to effect said reshaping and resizing. Said second element comprises a nonlinear optical element arranged to receive said optical carrier signal and said intermediate optical signal from said first element and to effect said transfer of said intensity modulation of said intermediate optical signal into said phase modulation on said optical carrier signal.

The reshaping and resizing of the intermediate optical signal is thus carried out independently of and prior to the transfer of the intensity modulation of the intermediate optical signal in to a phase modulation on the optical carrier signal.

In an embodiment, said optical signal converter is arranged to convert said phase modulation of said phase-modulated optical data signal into complementary corresponding intensity modulations of first and second said intermediate optical signals. Said optical carrier signal source is arranged to provide first and second optical carrier signals. Said optical signal forming apparatus comprises a further said resizing reshaping regenerator and a further said nonlinear optical element. Said resizing reshaping regenerator is arranged to receive said first intermediate optical signal and said further resizing reshaping regenerator is arranged to receive said second intermediate optical signal. Said nonlinear optical element is arranged to receive said first optical carrier signal and said first intermediate optical signal from said resizing reshaping regenerator. Said further nonlinear optical element is arranged to receive said second optical carrier signal and said second intermediate optical signal from said further resizing reshaping regenerator. Said optical signal regenerator further comprises an optical signal combiner arranged to receive and combine said respective regenerated phase-modulated optical data signals. Said optical output is arranged to output said combined regenerated phase-modulated optical data signal.

Using two intermediate optical signals, each having complementary intensity modulations corresponding to the phase information of the phase-modulated data signal, provides an improved optical signal to noise ratio as compared to using a single intermediate optical signal. Using a single intermediate optical signal allows the optical signal forming apparatus to be of a simpler construction, with a lower power consumption, than using two intermediate optical signals.

In an embodiment, the or each said resizing reshaping regenerator comprises an intensity modulation with direct detection resizing reshaping regenerator.

In an embodiment, the or each said nonlinear optical element comprises a Kerr-like medium having a transfer function having a substantially linear dependence of phase on intensity. A substantially linear transformation of the intensity modulation back into a phase modulation is thereby achieved, preserving the phase information of the phase-modulated data signal. In an embodiment, said Kerr-like medium comprises an optical fibre. In an embodiment, said Kerr-like medium comprises a semiconductor device, such as a semiconductor optical amplifier.

In an embodiment, said first and second elements comprise a composite device. Said composite device comprises a non-linear optical device arranged to apply a transfer function for effecting said reshaping and resizing of said intermediate optical signal and said transfer of an intensity modulation of said intermediate optical signal into a phase modulation on said optical carrier signal, to thereby form a regenerated phase-modulated optical data signal. The reshaping and resizing and the transfer of the intensity modulation can thus be carried out in a single processing step, in a single device. The complexity and footprint of the regenerator apparatus is thus minimized.

In an embodiment, said optical signal converter is arranged to convert said phase modulation of said phase-modulated optical data signal into complementary corresponding intensity modulations of first and second said intermediate optical signals. Said nonlinear optical device is arranged to receive said first and second said intermediate optical signals and is arranged to apply said transfer function to both said first and second said intermediate optical signals.

Using two intermediate optical signals, each having complementary intensity modulations corresponding to the phase information of the phase-modulated data signal, provides an improved optical signal to noise ratio as compared to using a single intermediate optical signal.

In an embodiment, said nonlinear optical device has a transfer function having a nonlinear dependence of phase on intensity. The nonlinear optical device can thus perform an efficient transformation from the intensity domain to the phase domain.

In an embodiment, said nonlinear optical device comprises an all-optical push-pull modulator. In an embodiment, said all-optical push-pull modulator comprises a semiconductor optical amplifier Mach-Zehnder interferometer. In an embodiment, said semiconductor optical amplifier Mach-Zehnder interferometer is biased at its null point. The interferometer thereby gives a $\pi$ step transition in the phase of the regenerated optical signal. Any phase noise is thus cancelled down to zero.

In an embodiment, said phase-modulated optical data signal has a differential phase-shift keying signal format. The all-optical phase-modulated data signal regenerator apparatus is thus able to regenerate an optical data signal having a differential phase-shift keying signal format while preserving the phase-modulation of the data signal, including differential encoding.

In an embodiment, said phase-modulated optical data signal comprises an in-phase component and a quadrature-phase component. Said optical signal converter is arranged to convert phase modulation of said in-phase component into a corresponding intensity modulation of an in-phase intermediate optical signal and to convert phase modulation of said quadrature-phase component into a corresponding intensity modulation of a quadrature-phase intermediate optical signal. Said regenerator further comprises a further said optical signal forming apparatus and a further optical signal combiner. Said optical carrier signal source is arranged to provide at least one said optical carrier signal for each said optical signal forming apparatus. Said optical signal forming apparatus is arranged to receive said in-phase intermediate optical signal. Said further optical signal forming apparatus is arranged to receive said quadrature-phase intermediate optical signal. Said further optical signal combiner is arranged to receive and combine said regenerated phase-modulated optical data signals respectively generated by each said optical signal forming apparatus. Said optical output is arranged to output said combined regenerated phase-modulated optical data signal.

The all-optical phase-modulated data signal regenerator apparatus is thus able to regenerate an optical data signal having a four- or higher-level phase modulation while preserving the phase-modulation of the data signal.

In an embodiment, said optical signal converter comprises a ninety-degree optical hybrid. Said ninety-degree optical hybrid is arranged to convert said phase modulation of said in-phase component into complementary corresponding intensity modulations of first and second said in-phase intermediate optical signals and to convert said phase modulation of said quadrature-phase component into complementary corresponding intensity modulations of first and second said quadrature-phase intermediate optical signals.

In an embodiment, said optical signal converter comprises a local oscillator and an optical coupler. Said local oscillator is arranged to provide a reference optical signal having the same frequency and phase as the phase-modulated optical data signal. Said optical coupler is arranged to receive said phase-modulated optical data signal and said reference signal and to cause optical interference between said phase-modulated optical data signal and said reference signal. A said intermediate optical signal comprising an intensity modulated sum optical signal or an intensity modulated difference optical signal is thereby produced.

In an embodiment, said phase-modulated optical data signal has a non-return-to-zero signal format. In an embodiment, said optical carrier signal source is arranged to provide a continuous wave optical carrier signal. In an embodiment, said local oscillator is arranged to provide a continuous wave reference optical signal locked to said phase-modulated optical data signal. The all-optical phase-modulated data signal regenerator apparatus is thus able to regenerate non-return-to-zero format phase-modulated optical data signals.

In an embodiment, said phase-modulated optical data signal has a return-to-zero signal format and said optical carrier signal source is arranged to provide a pulsed optical carrier signal. Said pulsed optical carrier signal has the same pulse width and frequency as said return-to-zero phase-modulated optical data signal. In an embodiment, said optical carrier signal source comprises an optical pulse source and an all-optical clock recovery apparatus. Said all-optical clock recovery apparatus being arranged to optically extract an optical clock signal from said phase-modulated optical data signal and to deliver said optical clock signal to said optical carrier signal source. Said optical carrier signal source is driven by said optical clock signal. In an embodiment, said local oscillator is arranged to extract a part of said phase-modulated optical data signal to thereby form said reference optical signal. The all-optical phase-modulated data signal regenerator apparatus is thus able to regenerate return-to-zero format phase-modulated optical data signals and to additionally perform retiming of the phase-modulated optical data signal.

In an embodiment, said optical carrier signal has a different wavelength to said phase-modulated optical data signal. The all-optical phase-modulated data signal regenerator apparatus is thus able to simultaneously carry out wavelength conversion and all-optical regeneration of the phase-modulated data signal.

A second aspect of the invention provides a method of regenerating a phase-modulated optical data signal. The method comprises receiving a phase-modulated optical data signal to be regenerated. The method further comprises converting phase modulation of said phase-modulated optical data signal into a corresponding intensity modulation of an intermediate optical signal. The method further comprises providing an optical carrier signal. The method further comprises transferring said intensity modulation of said intermediate optical signal into a phase modulation on said optical carrier signal, to thereby form a regenerated phase-modulated optical data signal. Said intensity modulation is transferred into said phase modulation by effecting reshaping and resizing of said intermediate optical signal and phase modulation of said optical carrier signal in dependence on an intensity modulation of said intermediate optical signal.

The method thus enables phase-modulated optical data signals to be regenerated while preserving the phase-modulation during regeneration.

In an embodiment, said method comprises converting said phase modulation of said phase-modulated optical data signal into complementary corresponding intensity modulations of first and second said intermediate optical signals. Said method further comprises providing first and second optical carrier signals. Said method comprises transferring said intensity modulation of each said intermediate optical signal into a phase modulation on a respective said optical carrier signal by effecting reshaping and resizing of each said intermediate optical signal and phase modulation of said respective optical carrier signal in dependence on an intensity modulation of said respective intermediate optical signal. First and second regenerated phase-modulated optical data signals are thereby formed. The method further comprises combining said first and second regenerated phase-modulated optical data signals to form a final regenerated phase-modulated optical data signal.

The method thus performs regeneration by independently reshaping and resizing the intermediate optical signals and then transferring the intensity modulation of the intermediate optical signals in to phase modulations on the optical carrier signals.

In an embodiment, said phase-modulated optical data signal comprises an in-phase component and a quadrature-phase component. Said method comprises converting phase modulation of said in-phase component into a corresponding intensity modulation of an in-phase intermediate optical signal and converting phase modulation of said quadrature-phase component into a corresponding intensity modulation of a quadrature-phase intermediate optical signal. Said method further comprises providing first and second optical carrier signals. Said method further comprises transferring said intensity modulation of each said intermediate optical signal into a phase modulation on a respective said optical carrier signal. In-phase and quadrature-phase regenerated phase-modulated optical data signals are thereby formed. Said method further comprises combining said in-phase and quadrature-phase regenerated phase-modulated optical data signals to form a final regenerated phase-modulated optical data signal.

The method is thus able to regenerate phase-modulated optical data signals having four- or higher-level phase-modulation.

In an embodiment, said phase-modulated optical data signal has a differential phase-shift keying signal format. The method enables differential phase-shift keying optical data signals to be regenerated while preserving differential encoding.

A third aspect of the invention provides a data carrier having computer readable instructions embodied therein. The said computer readable instructions are for providing access to resources available on a processor. The computer readable instructions comprise instructions to cause the processor to perform any of the above steps of the method of regenerating a phase-modulated optical data signal.

BRIEF DESCRIPTION OF THE DRAWINGS

FIG. 5 is a schematic representation of all-optical phase-modulated data signal regenerator apparatus according to a fifth embodiment of the invention;

FIG. 6 is a schematic representation of all-optical phase-modulated data signal regenerator apparatus according to a sixth embodiment of the invention;

DESCRIPTION OF EMBODIMENTS OF THE INVENTION

Figure 1:
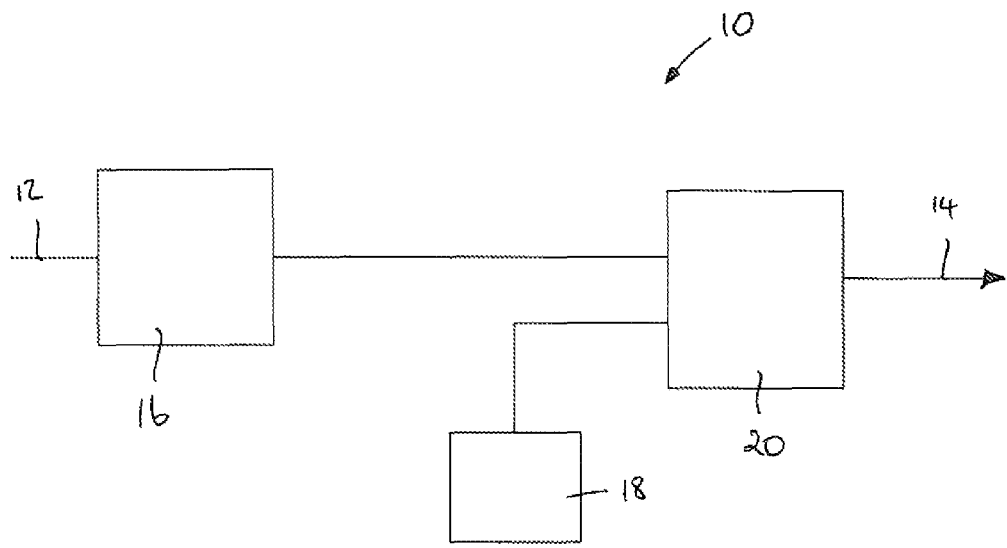
FIG. 1 is a schematic representation of all-optical phase-modulated data signal regenerator apparatus according to a first embodiment of the invention.

Referring to FIG. 1, a first embodiment of the invention provides all-optical phase-modulated data signal regenerator apparatus 10 comprising an optical input 12, an optical signal converter 16, an optical carrier signal source 18, optical signal forming apparatus 20 and an optical output 14.

The optical input 12 is arranged to receive a phase-modulated optical data signal to be regenerated. The optical signal converter 16 is arranged to receive the phase-modulated optical data signal and to convert the phase-modulation of the data signal into a corresponding intensity modulation of an intermediate optical signal.

The optical carrier signal source 18 is arranged to provide an optical carrier signal.

The optical signal forming apparatus 20 is arranged to receive the optical carrier signal from the optical carrier signal source 18 and to receive the intermediate optical signal from the optical signal converter 16. The optical signal forming apparatus 20 comprises a first element and a second element. The first element is arranged to receive the intermediate optical signal and to apply a transfer function for effecting reshaping and resizing. The second element is for effecting transfer of an intensity modulation of the intermediate optical signal into a phase-modulation on the optical carrier signal. A regenerated phase-modulated optical data signal is thereby formed by the optical signal forming apparatus 20.

The optical output 14 is arranged to output the regenerated phase-modulated optical data signal.

Figure 2:
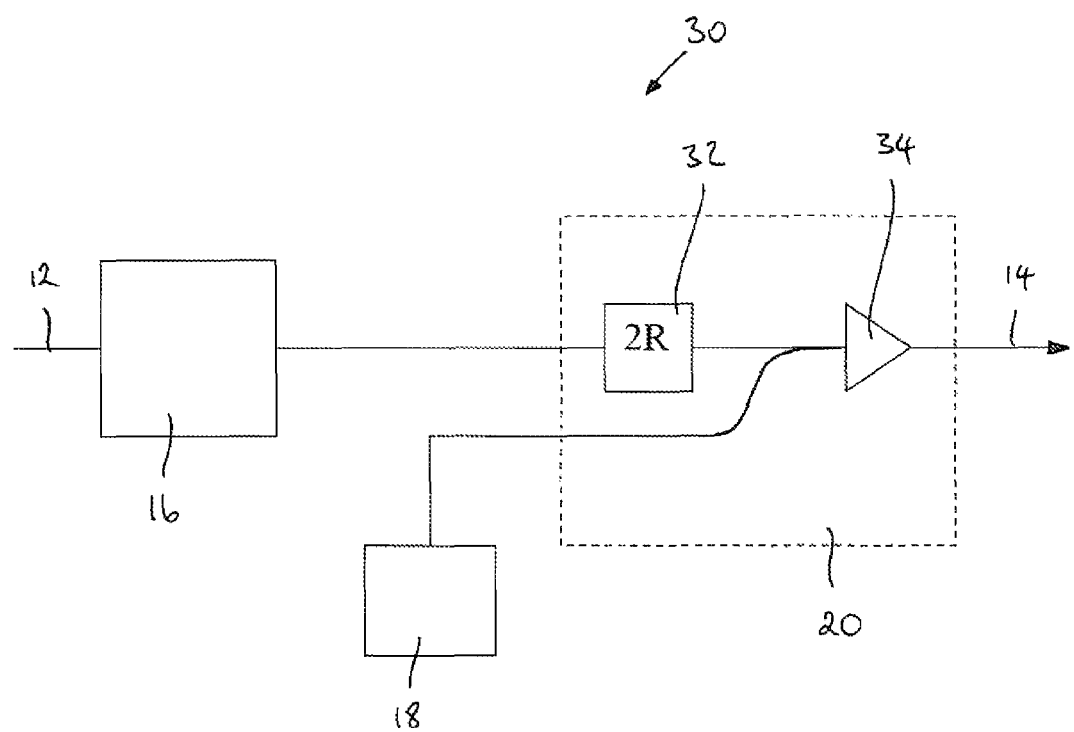
FIG. 2 is a schematic representation of all-optical phase-modulated data signal regenerator apparatus according to a second embodiment of the invention.

All-optical phase-modulated data signal regenerator apparatus 30 according to a second embodiment of the invention is shown in FIG. 2. The apparatus 30 of this embodiment is substantially the same as the apparatus 10 of the first embodiment, with the following modifications. The same reference numbers are retained for corresponding features.

In this embodiment, the optical signal forming apparatus 20 comprises a first element in the form of a resizing reshaping (2R) regenerator 32 and a second element comprising a nonlinear optical element 34. The 2R regenerator 32 is arranged to receive the intermediate optical signal and to apply a transfer function for effecting reshaping and resizing.

The nonlinear optical element 34 comprises a Kerr-like medium, such as an optical fibre or a semi-conductor optical amplifier (SOA), having a transfer function having a substantially linear dependence of phase on intensity. A Kerr-like medium will be understood to mean an optical medium having a nonlinear refractive index for which the nonlinear index change exhibits a linear dependence on the optical intensity.

The intermediate optical signal thus undergoes 2R regeneration following which the intensity modulation of the resized and reshaped intermediate optical signal is transferred into a phase-modulation on the optical carrier signal by the nonlinear optical element 34.

Figure 3:
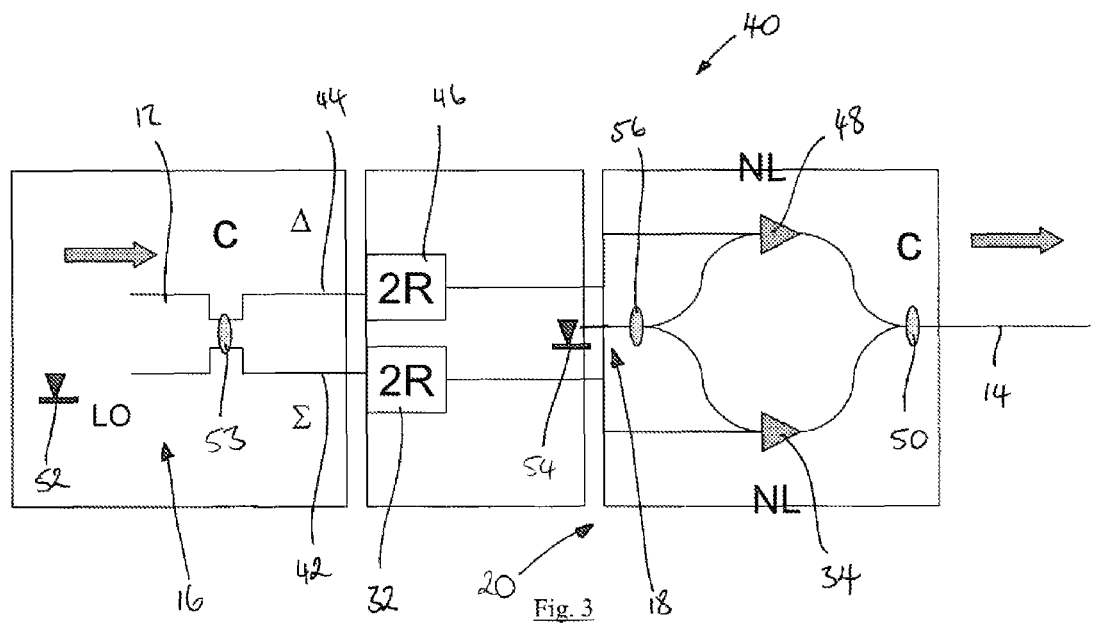
FIG. 3 is a schematic representation of all-optical phase-modulated data signal regenerator apparatus according to a third embodiment of the invention.

FIG. 3 shows all-optical phase-modulated data signal regenerator apparatus 40 according to a third embodiment of the invention. The apparatus 40 of this embodiment has the same general structure as the apparatus 10 of the first embodiment and the same reference numbers are retained for corresponding features. The regenerator apparatus 40 is arranged to regenerate a non-return-to-zero (NRZ) phase-modulated data signal.

In this embodiment the optical signal converter 16 comprises a local oscillator 52 and an optical coupler 53. The local oscillator 52 comprises a continuous wave (CW) laser arranged to generate a reference optical signal locked to the phase-modulated optical data signal. The optical coupler 53 is arranged to receive a phase-modulated optical data signal from the optical input 12 at a first input port and receives the reference signal from the local oscillator 52 at its second input port. The optical coupler 53 combines the data signal and the reference signal, causing constructive and destructive interference between the two signals. The optical signal converter 16 thereby produces a first intermediate optical signal 42, being a sum optical signal, from a first output port of the coupler 53 and a second intermediate optical signal 44, being a difference optical signal, from the second output of the coupler 53. Both the sum intermediate optical signal 42 and the difference intermediate optical signal 44 carry the phase information of the optical data signal as complementary intensity modulations.

The optical signal forming apparatus 20 of this embodiment further comprises a second resizing reshaping (2R) regenerator 46 and a second nonlinear optical element 48, which again comprises a Kerr-like medium.

The first resizing reshaping (2R) regenerator 32 receives the sum intermediate optical signal 42 and effects reshaping and resizing of the sum intermediate optical signal. The second 2R regenerator 46 receives the difference intermediate optical signal 44 and effects resizing and reshaping of the difference intermediate optical signal 44.

The optical signal carrier source 18 comprises a laser 54 arranged to generate a CW optical carrier signal and an optical splitter 56, arranged to split the optical carrier signal into substantially equal parts and to route each part to a respective nonlinear optical element 34, 48. In this example, the laser 54 is arranged to generate an optical carrier signal having substantially the same wavelength as the phase-modulated optical data signal. It will be appreciated however that the laser 54 may alternatively be arranged to generate an optical carrier signal having a different wavelength, thereby enabling the apparatus 40 to simultaneously perform regeneration and wavelength conversion of the phase modulated optical data signal.

The first nonlinear optical element 34 is arranged to receive the resized and reshaped sum intermediate optical signal 42 from the first 2R regenerator 32 and to receive a respective optical carrier signal from the optical carrier signal source 18. The second nonlinear optical element 48 is similarly arranged to receive the resized and reshaped difference intermediate optical signal 44 from the second 2R regenerator 46 and a respective optical carrier signal. Each nonlinear optical element 34, 48 is arranged to effect transfer of the intensity modulation of the respective intermediate optical signal into a phase-modulation on the respective optical carrier signal. First and second regenerated phase-modulated optical data signals are thereby produced.

The regenerator apparatus 40 further comprises a second optical coupler 50, arranged to receive the first and second regenerated phase-modulated optical data signals and to combine the regenerated signals. The optical output 14 is arranged to output the combined regenerated phase-modulated optical data signal.

The all-optical phase-modulated data signal regenerator apparatus 40 is thus able to regenerate NRZ phase-modulated optical data signals. The regenerator apparatus 40 may simultaneously perform wavelength conversion.

Figure 4:
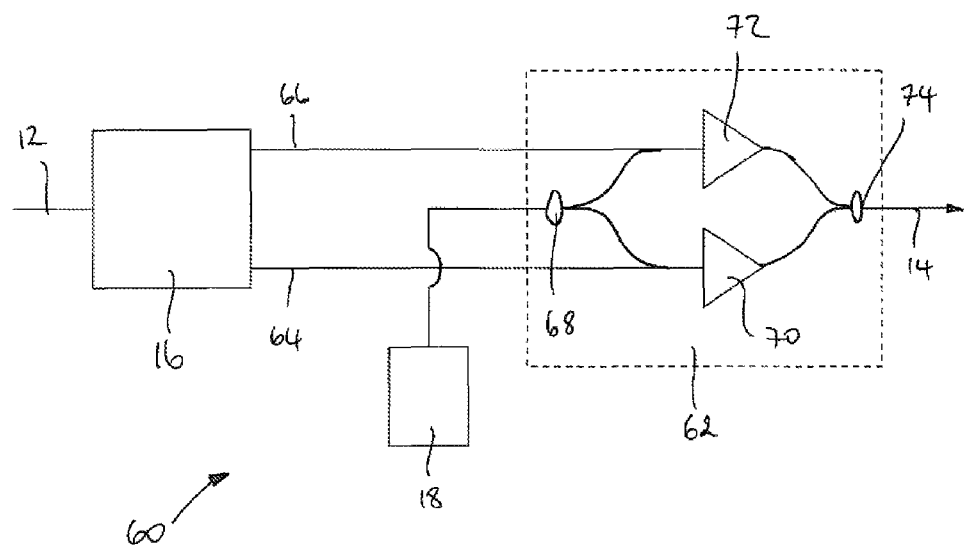
FIG. 4 is a schematic representation of all-optical phase-modulated data signal regenerator apparatus according to a fourth embodiment of the invention.

Referring to FIG. 4, a fourth embodiment of the invention provides all-optical phase-modulated data signal regenerator apparatus 60. The regenerator apparatus 60 has the same general structure as the regenerator apparatus 10 of FIG. 1 and the same reference numbers are retained for corresponding features. The regenerator apparatus 60 is for regenerating an NRZ data signal.

In this embodiment, the optical signal converter 16 is arranged to convert the phase-modulation of a received phase-modulated optical data signal into a sum intermediate optical signal 64 and a difference intermediate optical signal 66.

The optical signal forming apparatus 62 of this embodiment comprises a composite device comprising a nonlinear optical device arranged to apply a transfer function for effecting reshaping and resizing of each intermediate optical signal and transfer of an intensity modulation of each intermediate optical signal into a phase-modulation on a respective optical carrier signal. In this example, the optical signal forming apparatus 62 comprises an all-optical push-pull modulator in the form of a nonlinear Mach-Zehnder modulator comprising an SOA 70, 72 in each arm. A first arm comprising a first SOA 70 receives the sum intermediate optical signal 64 and a respective optical carrier signal. The second arm comprising the second SOA 72 receives the difference intermediate optical signal 66 and a respective optical carrier signal. The Mach-Zehnder modulator further comprises a coupler 74 arranged to receive and combine the resulting optical signals from each arm. The optical output 14 is arranged to output the combined optical signal from the Mach-Zehnder modulator 62.

The optical signal forming apparatus 62 further comprises an optical splitter 68 arranged to receive an optical carrier signal from the optical carrier signal source 18 and to split the optical carrier signal into two substantially equal parts, to be delivered to each of the SOAs 70, 72 respectively.

The nonlinear Mach-Zehnder modulator 62 effects reshaping and resizing and transfer of an intensity modulation of the intermediate optical signals into corresponding complimentary phase-modulations on the respective optical carrier signals.

The nonlinear Mach-Zehnder modulator 62 may be biased at the null point in order to give a step transition in the phase of the regenerated phase-modulated optical data signals, enabling the phase noise to be cancelled to zero.

Referring to FIG. 5, a fifth embodiment of the invention provides all-optical phase-modulated data signal regenerator apparatus 80. The regenerator apparatus 80 is for regenerating an NRZ differential quadrature phase shift keying (DQPSK) optical data signal having in-phase and quadrature phase signal components. The regenerator apparatus 80 has substantially the same arrangement as the regenerator 10 of the first embodiment, with the following modifications. The same reference numbers are retained for corresponding features.

In this embodiment, the regenerator apparatus 80 comprises first optical signal forming apparatus 20a and second signal forming apparatus 20b, as described in relation to FIG. 3. The first optical signal forming apparatus 20a is for the in-phase (I) component of the DQPSK optical data signal and the second optical signal forming apparatus 20b is for the quadrature-phase (Q) component of the DQPSK data signal.

The optical signal converter 82 of this embodiment comprises a 90° optical hybrid. A 90° optical hybrid will be well known to the person skilled in the art as having two input ports and four output ports for use in coherent signal demodulation for homodyne or heterodyne detection. In this example, a first input port of the 90° optical hybrid 82 is coupled to the input 12 of the regenerator apparatus 80 and the second input port is coupled to a local oscillator arranged to generate a reference optical signal 88. The 90° optical hybrid 82 mixes the incoming DQPSK I and Q components with the reference optical signal 88 to generate four output optical signals, being the sum of the I component and the reference optical signal 82a, the difference of the I component and the reference optical signal 82b, the sum of the Q component and the reference optical signal 82c, and the difference of the Q component and the reference optical signal 82d.

The sum and difference intermediate optical signals 82a, 82b of the I component are provided to the respective 2R regenerators 46, 32 of the first optical signal forming apparatus 20a. The sum and difference intermediate optical signals 82c, 82d of the Q component are provided to the respective 2R regenerators 46, 32 of the second optical signal forming apparatus 20b.

In this example, the optical signal forming apparatus comprises a laser 54 arranged to generate a CW optical carrier signal and an optical splitter 56 arranged to split the optical carrier signal into substantially equal first and second parts, respectively routed to the first and second optical signal forming apparatus 20a, 20b. Each optical signal forming apparatus 20a, 20b further comprises a further optical splitter 84 arranged to split the respective optical carrier signal into first and second parts for the first and second nonlinear optical elements 34, 48 respectively.

The intermediate optical signals 82a, 82b of the I component are processed by the optical signal forming apparatus 20a in the manner described above in relation to FIG. 3. The sum and difference intermediate optical signals 82c, 82d of the Q component are similarly processed by the second optical signal forming apparatus 20b in the manner described above in relation to FIG. 3. Each optical signal forming apparatus 20a, 20b produces a combined regenerated phase-modulated optical data signal.

The regenerator apparatus 80 further comprises a further optical coupler 86 arranged to receive and combine the regenerated optical data signals from each of the signal forming apparatus 20a, 20b. The optical output 14 is arranged to output the final combined regenerated optical data signal.

The regenerator apparatus 80 is thus able to regenerate an NRZ-DQPSK optical data signal whilst preserving the differential encoding of the optical data signal.

Referring to FIG. 6, a sixth embodiment of the invention provides all optical phase-modulated data signal regenerator apparatus 90. The regenerator apparatus 90 is substantially the same as the regenerator apparatus 80 of FIG. 6, with the following modifications. The same reference numbers are retained for corresponding features.

In this embodiment, the regenerator apparatus 90 is arranged to regenerate RZ-DQPSK optical data signals. The regenerator apparatus 90 comprises an optical carrier signal source 92 arranged to generate an RZ pulse train optical carrier signal. The regenerator apparatus 90 further comprises an all-optical clock recovery apparatus (AOCR) 94 arranged to optically extract a clock signal from the phase-modulated optical data signal and to deliver the clock signal to the optical carrier signal source 92. The optical carrier signal source 92 is driven by the clock signal to thereby form a reference optical signal having the same pulse width and frequency as the optical data signal. This restores the regular RZ pulse train and removes pulse jitter.

The regenerator apparatus 90 is thus able to additionally perform retiming regeneration.

Figure 7:
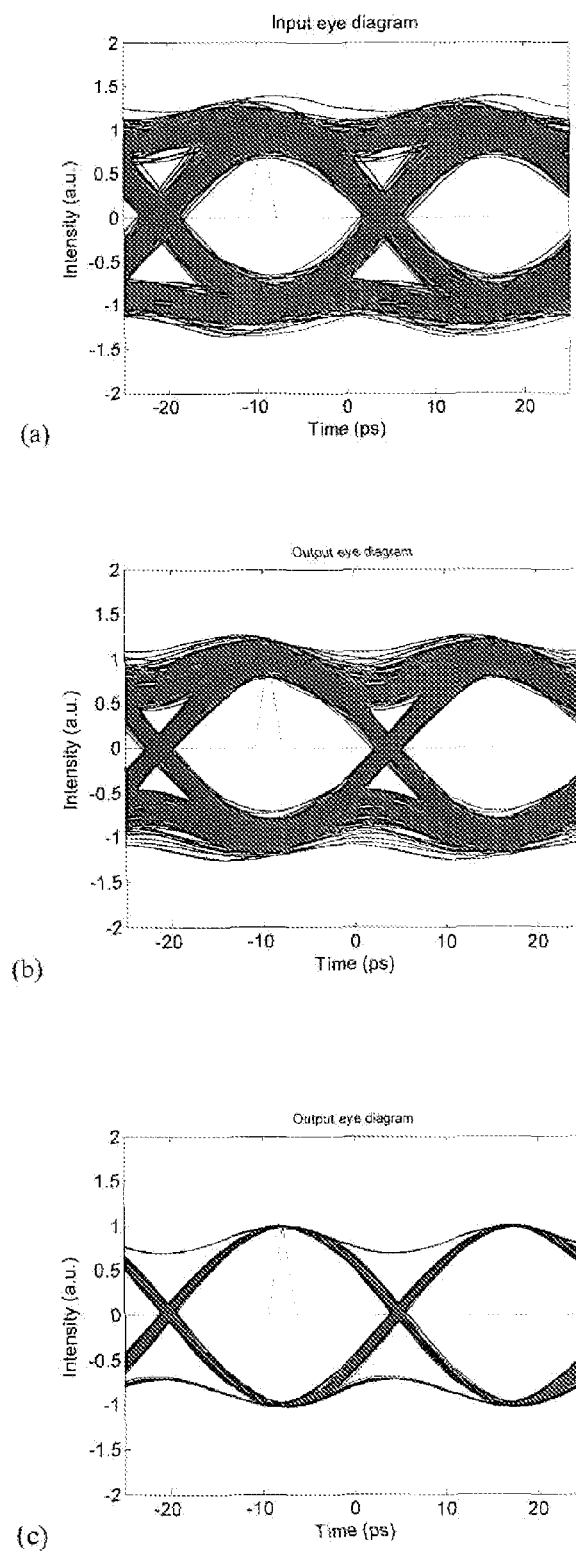
FIG. 7 shows eye diagrams for a 40 Gbs RZ-DPSK data signal: a) at the input to the regenerator apparatus; b) at the output of a prior art regenerator; and c) at the output of the regenerator apparatus of FIG. 3.

FIG. 7 shows an eye diagram of a 40 Gbs RZ-DPSK optical data signal at the input 12 of the regenerator apparatus 90 of FIG. 6. FIG. 7b shows an output eye diagram from a prior art regenerator apparatus. FIG. 7c shows an eye diagram of the regenerated phase-modulated optical data signal provided at the output 14 of the regenerator apparatus 90. As can be seen, the regenerator apparatus 90 provides a greater improvement in the openness of the eye diagram than is achieved using the prior art regenerator.

Figure 8:
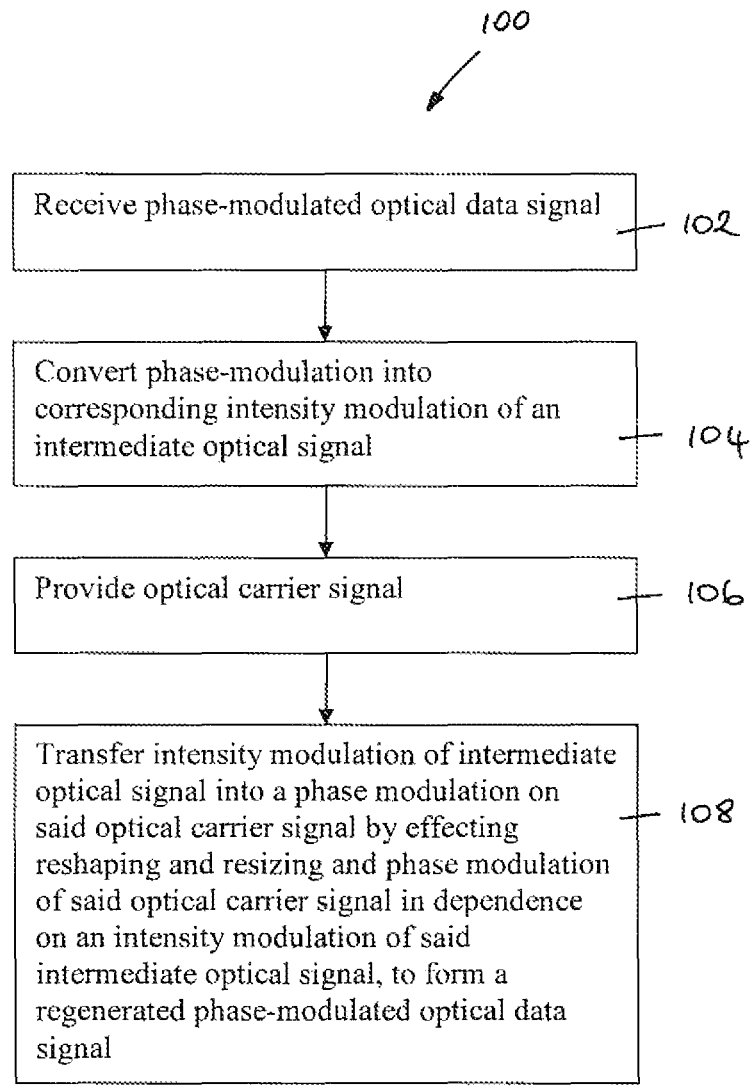
FIG. 8 shows the steps of a method of regenerating a phase-modulated optical data signal according to a seventh embodiment of the invention.

Referring to FIG. 8, a seventh embodiment of the invention provides a method 100 of regenerating a phase-modulated optical data signal. The method 100 comprises: receiving a phase-modulated optical data signal 102; converting the phase-modulation of the received optical data signal into a corresponding intensity modulation of an intermediate optical signal 104; providing an optical carrier signal 106; and transferring an intensity modulation of the intermediate optical signal into a phase-modulation on the optical carrier signal 108. The method comprises effecting reshaping and resizing and phase-modulation of the optical carrier signal in dependence on an intensity modulation of the intermediate optical signal. A regenerated phase-modulated optical data signal is thus formed.

Figure 9:
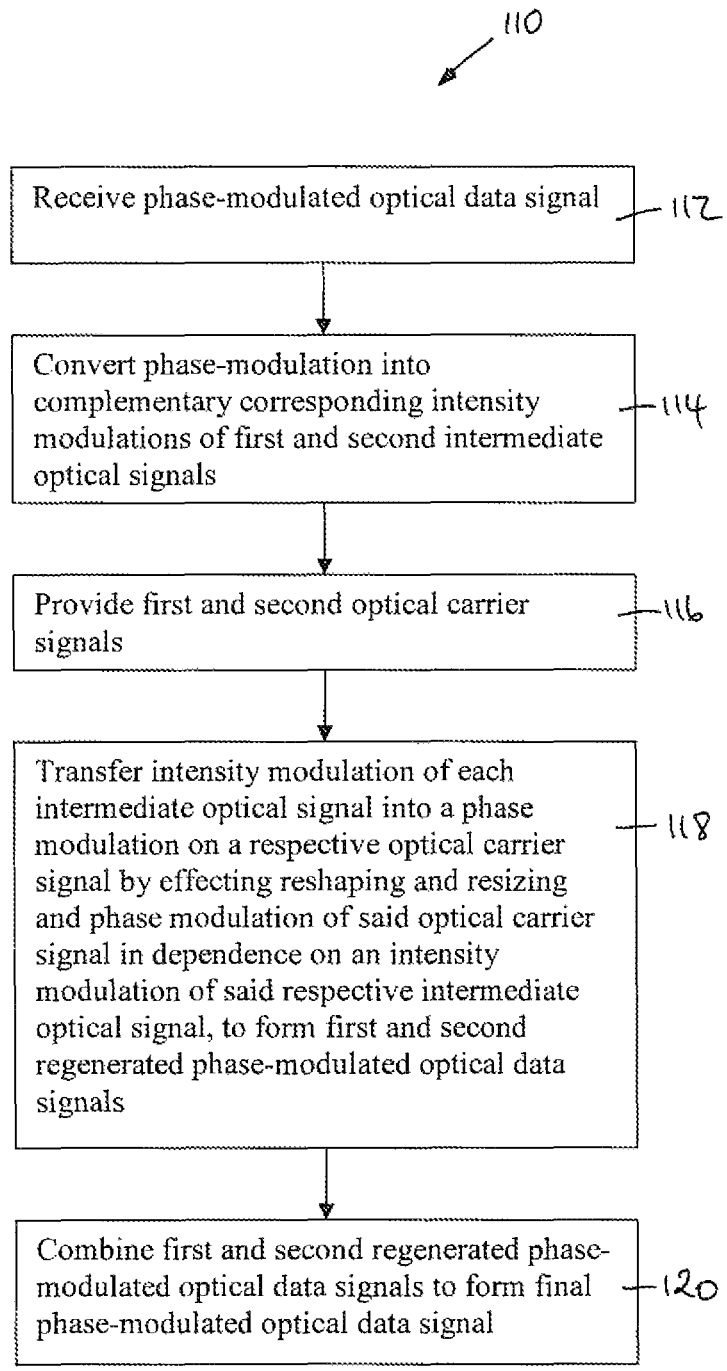
FIG. 9 shows the steps of a method of regenerating a phase-modulated optical data signal according to an eighth embodiment of the invention.

Referring to FIG. 9, an eighth embodiment of the invention provides a method 110 of regenerating a phase-modulated optical data signal. The method 110 comprises: receiving a phase-modulated optical data signal 112; converting the phase-modulation of the received optical data signal into complementary corresponding intensity modulations of first and second intermediate optical signals 114; providing first and second optical carrier signals 116; transferring an intensity modulation of each intermediate optical signal into a phase-modulation on a respective optical carrier signal 118. The method comprises effecting reshaping and resizing and phase-modulation of the optical carrier signals in dependence on an intensity modulation of the respective intermediate optical signal. First and second regenerated phase-modulated optical data signals are thus formed. The method 110 further comprises combining the first and second regenerated phase-modulated optical data signals to form a combined regenerated phase-modulated optical data signal 120.

Figure 10:
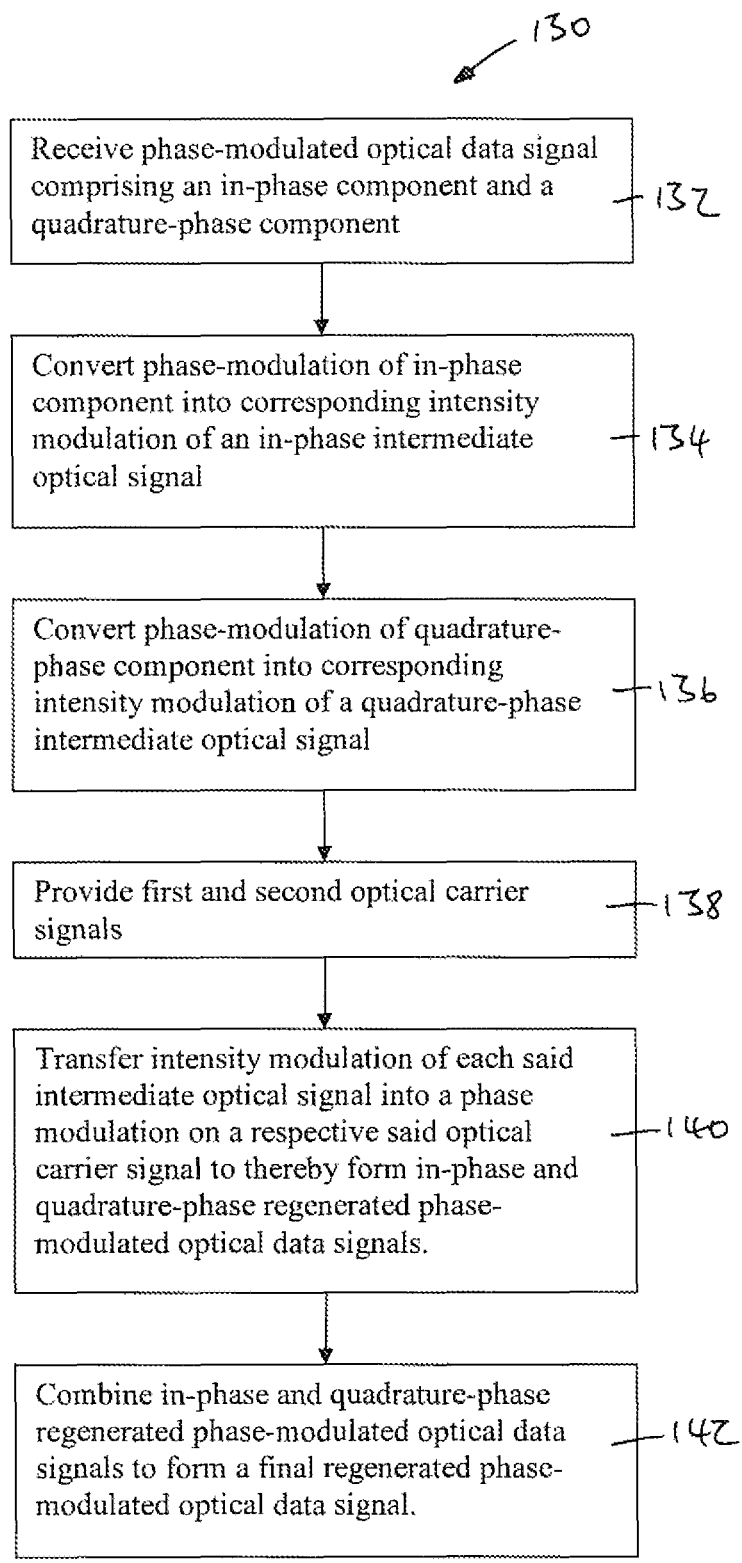
FIG. 10 shows the steps of a method of regenerating a phase-modulated optical data signal according to a ninth embodiment of the invention.

FIG. 10 shows the steps of a method 130 of regenerating a phase-modulated optical data signal according to a ninth embodiment of the invention.

The method 130 comprises: receiving a phase-modulated optical data signal comprising an in-phase component and a quadrature-phase component 132; converting the phase-modulation of the in-phase component into a corresponding intensity modulation of an in-phase intermediate optical signal 134; converting the phase-modulation of the quadrature-phase component into a corresponding intensity modulation of a quadrature-phase intermediate optical signal 136; providing first and second optical carrier signals 138; transferring an intensity modulation of each intermediate optical signal into a phase-modulation on a respective one of the optical carrier signals to thereby form in-phase and quadrature-phase regenerated optical data signals 140; and combining the in-phase and quadrature-phase regenerated optical data signals to form a final regenerated optical data signal 142.

A further embodiment of the invention provides a data carrier having computer readable instructions embodied therein. The computer readable instructions are for providing access to resources available on a processor. The computer readable instructions comprise instructions to cause the processor to perform any of the above steps of the methods of regenerating a phase-modulated optical data signal, as shown in FIGS. 8 and 9. It will be understood that data carrier is intended to mean any medium capable of carrying data, including data storage media and electrical and optical data carrier signals.

The invention claimed is:

1. All-optical phase-modulated data signal regenerator apparatus comprising:
an optical input arranged to receive a phase-modulated optical data signal;
an optical signal converter arranged to receive said phase-modulated optical data signal and to convert phase modulation of said phase-modulated optical data signal into a sum intermediate optical signal and a difference intermediate optical signal
an optical carrier signal source arranged to provide first and second optical carrier signals;
optical signal forming apparatus arranged to receive said first and second optical carrier signals and said first and second intermediate optical signals, the optical signal forming apparatus comprising:
a first resizing reshaping regenerator arranged to receive said sum intermediate optical signal and arranged to apply a transfer function for effecting reshaping and resizing said sum intermediate optical signal,
a second resizing reshaping regenerator arranged to receive said difference intermediate optical signal and arranged to apply a transfer function for effecting reshaping and resizing said difference intermediate optical signal,
a first non-linear optical element arranged to receive said first optical carrier signal and said sum intermediate optical signal from said first resizing reshaping regenerator for effecting transfer of an intensity modulation of said sum intermediate optical signal into a phase modulation on said first optical carrier signal to thereby form a first regenerated phase-modulated optical data signal,
a second non-linear optical element arranged to receive said second optical carrier signal and said difference intermediate optical signal from said second resizing reshaping regenerator for effecting transfer of an intensity modulation on said second optical carrier signal to thereby form a second regenerated phase-modulated optical data signal, and
an optical signal combiner arranged to receive and combine said first and second regenerated phase-modulated optical data signals; and
an optical output arranged to output a combined regenerated phase-modulated optical data signal from the optical signal combiner.

2. All-optical phase-modulated data signal regenerator apparatus as claimed in claim 1, wherein at least one of said first and second nonlinear optical elements comprise Kerr-like medium having a transfer function having a substantially linear dependence of phase on intensity.

3. All-optical phase-modulated data signal regenerator apparatus as claimed in claim 1, wherein said first resizing reshaping regenerator and first non-linear optical element comprise a composite device comprising a nonlinear optical device arranged to apply a transfer function for effecting said reshaping and resizing of said sum intermediate optical signal and said transfer of an intensity modulation of said sum intermediate optical signal into a phase modulation on said first optical carrier signal, to thereby form the first regenerated phase-modulated optical data signal.

4. All-optical phase-modulated data signal regenerator apparatus as claimed in claim 3, wherein said optical signal converter is arranged to convert said phase modulation of said phase-modulated optical data signal into complementary corresponding intensity modulations of said sum and difference intermediate optical signals and said nonlinear optical device is arranged to receive said sum and difference intermediate optical signals and is arranged to apply said transfer function to both said sum and difference said intermediate optical signals.

5. All-optical phase-modulated data signal regenerator apparatus as claimed in claim 3, wherein said nonlinear optical device has a transfer function having a nonlinear dependence of phase on intensity.

6. All-optical phase-modulated data signal regenerator apparatus as claimed in claim 5, wherein said nonlinear optical device comprises an all-optical push-pull modulator.

7. All-optical phase-modulated data signal regenerator apparatus as claimed in claim 1, wherein said phase-modulated optical data signal has a differential phase-shift keying signal format.

8. All-optical phase-modulated data signal regenerator apparatus as claimed in claim 7, wherein said phase-modulated optical data signal comprises an in-phase component and a quadrature-phase component, and said optical signal converter is arranged to convert phase modulation of said in-phase component into a corresponding intensity modulation of an in-phase intermediate optical signal and to convert phase modulation of said quadrature-phase component into a corresponding intensity modulation of a quadrature-phase intermediate optical signal, and said regenerator further comprises a further said optical signal forming apparatus and a further optical signal combiner, and said optical carrier signal source is arranged to provide at least one said optical carrier signal for each said optical signal forming apparatus, and said optical signal forming apparatus is arranged to receive said in-phase intermediate optical signal and said further optical signal forming apparatus is arranged to receive said quadrature-phase intermediate optical signal, and said further optical signal combiner is arranged to receive and combine said regenerated phase-modulated optical data signals respectively generated by each said optical signal forming apparatus, said optical output being arranged to output said combined regenerated phase-modulated optical data signal.

9. All-optical phase-modulated data signal regenerator apparatus as claimed in claim 8, wherein said optical signal converter comprises a ninety-degree optical hybrid and is arranged to convert said phase modulation of said in-phase component into complementary corresponding intensity modulations of first and second said in-phase intermediate optical signals and to convert said phase modulation of said quadrature-phase component into complementary corresponding intensity modulations of first and second said quadrature-phase intermediate optical signals.

10. A method of regenerating a phase-modulated optical data signal comprising:
    receiving a phase-modulated optical data signal to be regenerated;
    converting phase modulation of said phase-modulated optical data signal into a sum intermediate optical signal and a difference intermediate optical signal;
    providing first and second optical carrier signals;
    receiving, by a first resizing reshaping regenerator, said sum intermediate optical signal;
    applying, by the first resizing reshaping regenerator, a transfer function for effecting reshaping and resizing said said sum intermediate optical signal;
    receiving, by a second resizing reshaping regenerator, said difference intermediate optical signal;
    applying, by the first resizing reshaping regenerator, a transfer function for effecting reshaping and resizing said said difference intermediate optical signal;
    receiving, by a first non-linear optical element, said first optical carrier signal and said sum intermediate optical signal from said first resizing reshaping regenerator;
    transferring, by the first non-linear optical element, said intensity modulation of said sum intermediate optical signal into a phase modulation on said first optical carrier signal to thereby form a first regenerated phase-modulated optical data signal;
    receiving, by a second non-linear optical element, said second optical carrier signal and said difference intermediate optical signal from said second resizing reshaping regenerator;
    transferring, by the second non-linear optical element, said intensity modulation of said difference intermediate optical signal into a phase modulation on said second optical carrier signal to thereby form a second regenerated phase-modulated optical data signal;
    receiving and combining, by an optical signal combiner, said first and second regenerated phase-modulated optical data signals; and
    outputting a combined regenerated phase-modulated optical data signal.

11. A method as claimed in claim 10, wherein said phase-modulated optical data signal has a differential phase-shift keying signal format.

12. The all-optical phase-modulated data signal regenerator apparatus as claimed in claim 1, wherein the optical signal converter comprises a locked local oscillator.

13. The all-optical phase-modulated data signal regenerator apparatus as claimed in claim 12, wherein the locked local oscillator is configured to preserve the differential encoding of the phase-modulated optical data signal.

14. The method as claimed in claim 10, wherein the optical signal converter comprises a locked local oscillator.

15. The method as claimed in claim 10, wherein the locked local oscillator is configured to preserve the differential encoding of the phase-modulated optical data signal.

* * * * *